US009839815B2

(12) United States Patent
Matsuyama et al.

(10) Patent No.: US 9,839,815 B2
(45) Date of Patent: *Dec. 12, 2017

(54) GOLF BALL

(71) Applicant: Dunlop Sports Co. Ltd., Kobe-shi, Hyogo (JP)

(72) Inventors: Yoshiko Matsuyama, Kobe (JP); Toshiyuki Tarao, Kobe (JP)

(73) Assignee: DUNLOP SPORTS CO. LTD., Kobe-shi, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/979,780

(22) Filed: Dec. 28, 2015

(65) Prior Publication Data
US 2016/0184654 A1 Jun. 30, 2016

(30) Foreign Application Priority Data

Dec. 26, 2014 (JP) ................. 2014-266656

(51) Int. Cl.
*A63B 37/00* (2006.01)
*A63B 37/12* (2006.01)
*C09D 175/08* (2006.01)
*C08G 18/66* (2006.01)
*C08G 18/79* (2006.01)
*C08G 18/72* (2006.01)
*C08G 18/10* (2006.01)

(52) U.S. Cl.
CPC ...... *A63B 37/0074* (2013.01); *A63B 37/0022* (2013.01); *C09D 175/08* (2013.01); *A63B 37/0096* (2013.01); *C08G 18/10* (2013.01); *C08G 18/6677* (2013.01); *C08G 18/722* (2013.01); *C08G 18/792* (2013.01)

(58) Field of Classification Search
CPC ................ C08G 18/725; C08G 18/722; C08G 18/6677; C98G 18/792; C98G 18/6517; A63B 37/0022
See application file for complete search history.

(56) References Cited

U.S. PATENT DOCUMENTS

| 6,210,295 B1 * | 4/2001 | Yoneyama ............. A63B 37/12 |
| | | 473/351 |
| 9,440,117 B2 * | 9/2016 | Tarao ................. A63B 37/0022 |
| 9,533,196 B2 * | 1/2017 | Isogawa ................. C08G 18/10 |
| 2011/0053708 A1 | 3/2011 | Isoagawa et al. |
| 2011/0244989 A1 | 10/2011 | Tarao et al. |
| 2013/0331205 A1 * | 12/2013 | Tarao ................. C08G 18/4854 |
| | | 473/378 |
| 2015/0182804 A1 * | 7/2015 | Tarao ................. A63B 37/0022 |
| | | 473/374 |
| 2015/0273276 A1 * | 10/2015 | Isogawa ................. C08G 18/10 |
| | | 473/374 |

FOREIGN PATENT DOCUMENTS

| JP | 2011-67595 A | 4/2011 |
| JP | 2011-217820 A | 11/2011 |

* cited by examiner

Primary Examiner — David Buttner
(74) Attorney, Agent, or Firm — Birch, Stewart, Kolasch & Birch, LLP

(57) ABSTRACT

An object of the present invention is to provide a golf ball showing excellent shot feeling and stain resistance. The present invention provides a golf ball comprising a golf ball body and a paint film formed on a surface of the golf ball body, wherein a base resin constituting the paint film includes a polyurethane obtained by a reaction between a polyol composition and a polyisocyanate composition, a molar ratio (NCO/OH) of an isocyanate group (NCO group) in the polyisocyanate composition to a hydroxyl group (OH group) in the polyol composition is 0.6 or more, and the paint film has an elastic modulus of 300 MPa or less.

19 Claims, 1 Drawing Sheet

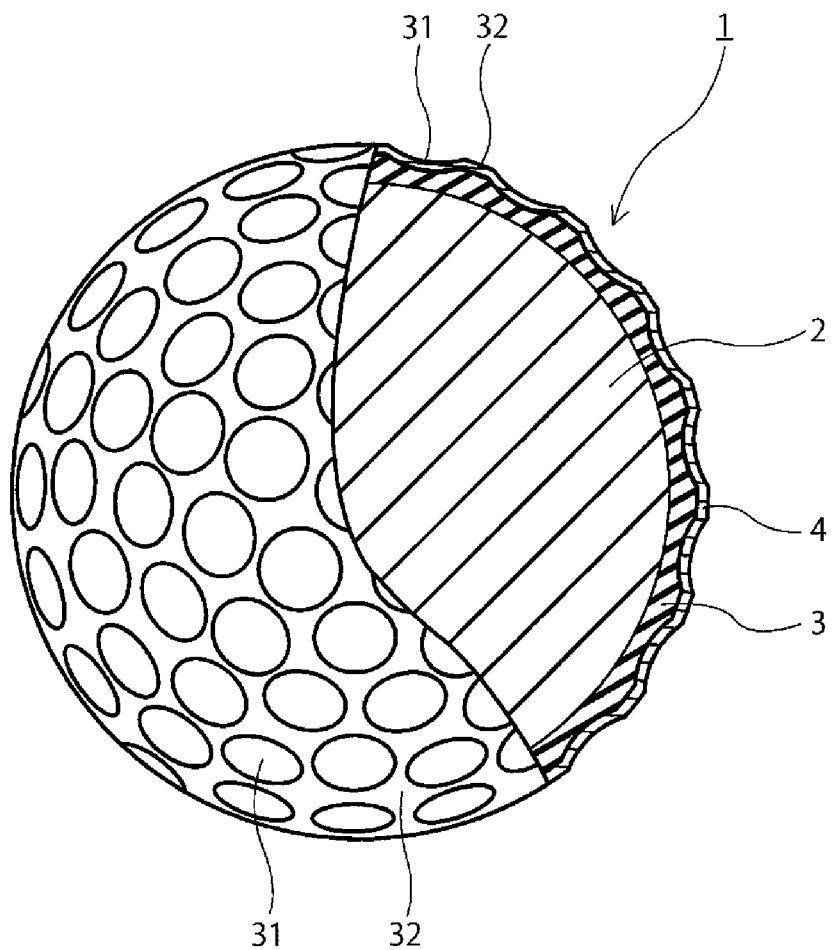

GOLF BALL

FIELD OF THE INVENTION

The present invention relates to a golf ball comprising a paint film.

DESCRIPTION OF THE RELATED ART

A paint film is formed on the surface of a golf ball body. The improvement of the golf ball properties has been proposed by improving the paint film.

Japanese Patent Publication No. 2011-67595 A discloses a golf ball comprising a core, a cover disposed on an outer side of the core, and a paint layer disposed on an outer side of the cover, wherein the cover has a Shore D hardness of 61 or less, and the paint layer has a martens hardness of 2.0 mgf/µm$^2$ or less.

Japanese Patent Publication No. 2011-217820 A discloses a golf ball comprising a golf ball body and a paint film formed on a surface of the golf ball body, wherein the paint film has a martens hardness of 2.0 mgf/µm$^2$ or less, and a ratio (50% modulus/10% modulus) of 50% modulus to 10% modulus is 1.6 or more.

SUMMARY OF THE INVENTION

According to the conventional technology, the spin performance is improved by softening the paint film. In addition, the shot feeling of the golf ball is also improved by softening the paint film. Herein, examples of the method for softening the paint film include a method of decreasing the amount of a curing agent, thereby decreasing the crosslinking degree of the paint film. However, lower crosslinking degree of the paint film causes a problem of a lower stain resistance of the paint film. The present invention has been achieved in view of the above circumstances, and an object of the present invention is to provide a golf ball showing excellent shot feeling and stain resistance.

The golf ball according to the present invention comprises a golf ball body and a paint film formed on a surface of the golf ball body, wherein a base resin constituting the paint film includes a polyurethane obtained by a reaction between a polyol composition and a polyisocyanate composition, a molar ratio (NCO/OH) of an isocyanate group (NCO group) of the polyisocyanate composition to a hydroxyl group (OH group) of the polyol composition is 0.6 or more, and the paint film has an elastic modulus of 300 MPa or less.

The golf ball according to the present invention controls the elastic modulus of the paint film as low as 300 MPa or less, while increasing the crosslinking degree of the paint film by making the molar ratio (NCO/OH) of the NCO group of the polyisocyanate composition constituting the paint film to the OH group of the polyol composition constituting the paint film 0.6 or more. By such constitution, the golf ball strikes a good balance between the shot feeling and the stain resistance.

According to the present invention, a golf ball showing excellent shot feeling and stain resistance is obtained.

BRIEF DESCRIPTION OF THE DRAWINGS

FIG. 1 is a partially cutaway sectional view showing a golf ball according to one embodiment of the present invention.

DESCRIPTION OF THE PREFERRED EMBODIMENT

The golf ball according to the present invention comprises a golf ball body and a paint film formed on a surface of the golf ball body. The paint film has an elastic modulus of 300 MPa or less, preferably 200 MPa or less, and more preferably 150 MPa or less. If the paint film has an elastic modulus of 300 MPa or less, the shot feeling of the golf ball improves. The elastic modulus of the paint film is preferably 40 MPa or more, more preferably 42 MPa or more, and even more preferably 45 MPa or more. If the paint film has an elastic modulus of 40 MPa or more, the spin performance can be further enhanced while inhibiting the decrease in the stain resistance of the paint film.

A base resin constituting the paint film includes a polyurethane obtained by a reaction between a polyol composition and a polyisocyanate composition. Further, in the reaction between the polyol composition and the polyisocyanate composition to obtain the polyurethane, a molar ratio (NCO group/OH group) of an isocyanate group (NCO group) of the polyisocyanate composition to a hydroxyl group (OH group) of the polyol composition is 0.6 or more, preferably 0.65 or more, and more preferably 0.70 or more. If the molar ratio (NCO group/OH group) is 0.6 or more, the crosslinking density becomes high, and thus the obtained paint film shows better stain resistance. On the other hand, if the molar ratio (NCO group/OH group) is excessively large, the amount of the isocyanate groups becomes excessive, and thus the obtained paint film may become hard and fragile, and the appearance thereof may deteriorate. For this reason, the molar ratio (NCO group/OH group) is preferably 1.20 or less, more preferably 1.15 or less, and even more preferably 1.10 or less. The reason why the appearance of the obtained paint film deteriorates if the amount of the isocyanate groups is excessive in the paint is considered that if the amount of the isocyanate groups is excessive, the moisture in air and the isocyanate group react more frequently, thereby generating a lot of carbon dioxide gas.

The elastic modulus (MPa) of the paint film and the molar ratio (NCO/OH) of the isocyanate group (NCO group) of the polyisocyanate composition to the hydroxyl group (OH group) of the polyol composition preferably satisfy the relationship expressed by the following formula (1). If the following formula (1) is satisfied, the softness of the paint film can be maintained even if the molar ratio (NCO/OH) is increased, and thus the obtained golf ball shows better shot feeling and more excellent stain resistance.

$$Y \leq 960 \times X - 470 \quad (1)$$

In the formula, Y represents the elastic modulus (MPa) of the paint film, and X represents the molar ratio (NCO/OH) of the isocyanate group (NCO group) of the polyisocyanate composition to the hydroxyl group (OH group) of the polyol composition.

Next, the polyol composition and the polyisocyanate composition constituting the paint film will be explained.

The polyol composition contains a polyol compound. Examples of the polyol compound include a low molecular weight polyol having a molecular weight of less than 500, and a high molecular weight polyol having an average molecular weight of 500 or more. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. Examples of the high molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; a urethane polyol; and an acrylic polyol. These polyol compounds may be used solely or as a mixture of at least two of them.

The polyol composition preferably contains a urethane polyol. The content of the urethane polyol in the polyol compound contained in the polyol composition is preferably 60 mass % or more, more preferably 70 mass % or more, and even more preferably 80 mass % or more. The polyol composition preferably contains only the urethane polyol as the polyol compound.

Examples of the polyol component of the urethane polyol include a low molecular weight polyol component having a molecular weight of less than 500, and a high molecular weight polyol component having an average molecular weight of 500 or more. Examples of the low molecular weight polyol component include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. Examples of the high molecular weight polyol component include a polyether diol and a polyester diol. These polyol components may be used solely or as a mixture of at least two of them.

The urethane polyol is a compound having a plurality of urethane bonds in its molecule, and having at least two hydroxyl groups in one molecule thereof. Examples of the urethane polyol include a urethane prepolymer obtained by a reaction between a polyol and a polyisocyanate, under a condition that the amount of the hydroxyl groups of the polyol is excessive to the amount of the isocyanate groups of the polyisocyanate. The urethane polyol preferably includes a polyether diol having a number average molecular weight ranging from 800 to 3,000, as the polyol component. If the urethane polyol including such a polyol component is used, the obtained paint film becomes soft, and thus the spin performance of the golf ball is increased.

Examples of the polyether diol constituting the urethane polyol include polyoxyethylene glycol, polyoxypropylene glycol, and polyoxytetramethylene glycol. Among them, polyoxytetramethylene glycol is preferred.

The number average molecular weight of the polyether diol is preferably 800 or more, more preferably 900 or more, and even more preferably 1,000 or more, and is preferably 3,000 or less, more preferably 2,000 or less, and even more preferably 1,500 or less. If the number average molecular weight of the polyether diol is 800 or more, the distance between crosslinking points in the paint film becomes long, the paint film becomes soft, and thus the spin performance is enhanced. If the number average molecular weight is 3,000 or less, the distance between crosslinking points in the paint film does not become excessively long, and thus the stain resistance of the paint film becomes better. It is noted that the number average molecular weight of the polyol component can be measured, for example, by gel permeation chromatography (GPC), using polystyrene as a standard material, tetrahydrofuran as an eluate, and an organic solvent system GPC column (e.g. "Shodex (registered trademark) KF series" available from Showa Denko K.K.) as a column.

The urethane polyol preferably includes a triol component and a diol component as the polyol component. Trimethylolpropane is preferred as the triol component. A mixing ratio (triol component/diol component) of the triol component to the diol component is preferably 0.2 or more, more preferably 0.5 or more, and is preferably 6.0 or less, more preferably 5.0 or less in a mass ratio.

The polyisocyanate component constituting the urethane polyol is not particularly limited, as long as it is a compound having at least two isocyanate groups. Examples of the polyisocyanate component include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and para-phenylene diisocyanate (PPDI); and an alicyclic polyisocyanate or aliphatic polyisocyanate such as 4,4'-dicyclohexylmethane diisocyanate ($H_{12}$MDI), hydrogenated xylylene diisocyanate ($H_6$XDI), hexamethylene diisocyanate (HDI), isophorone diisocyanate (IPDI), and norbornene diisocyanate (NBDI). These polyisocyanates may be used solely, or at least two of them may be used in combination.

The content of the polyether diol having a number average molecular weight ranging from 800 to 3,000 in the urethane polyol is preferably 70 mass % or more, more preferably 72 mass % or more, and even more preferably 75 mass % or more. The polyether diol having a number average molecular weight ranging from 800 to 3,000 forms a soft segment in the paint film. Therefore, if the content of the polyether diol is 70 mass % or more, the obtained golf ball shows further enhanced spin performance.

The weight average molecular weight of the urethane polyol is preferably 5,000 or more, more preferably 5,300 or more, and even more preferably 5,500 or more, and is preferably 20,000 or less, more preferably 18,000 or less, and even more preferably 16,000 or less. If the weight average molecular weight of the urethane polyol is 5,000 or more, the distance between crosslinking points in the paint film becomes long, the paint film becomes soft, and thus the spin performance is enhanced. If the weight average molecular weight is 20,000 or less, the distance between crosslinking points in the paint film does not become excessively long, and thus the stain resistance of the paint film becomes better.

The hydroxyl value of the urethane polyol is preferably 10 mg KOH/g or more, more preferably 15 mg KOH/g or more, and even more preferably 20 mg KOH/g or more, and is preferably 200 mg KOH/g or less, more preferably 190 mg KOH/g or less, and even more preferably 180 mg KOH/g or less.

The hydroxyl value of the polyol contained in the polyol composition is preferably 10 mg KOH/g or more, more preferably 15 mg KOH/g or more, and even more preferably 20 mg KOH/g or more, and is preferably 400 mg KOH/g or less, more preferably 300 mg KOH/g or less, even more preferably 200 mg KOH/g or less, particularly preferably 170 mg KOH/g or less, and most preferably 160 mg KOH/g or less. If the hydroxyl value of the polyol component falls within the above range, the adhesion between the paint film and the golf ball body increases. It is noted that, in the present invention, the hydroxyl value can be measured by, for example, an acetylization method, in accordance with JIS K 1557-1.

Specific examples of the polyol compound include 121B available from Wayaku Paint Co. Ltd.; Nippollan 800 and Nippollan 1100 available from Nippon Polyurethane Industry Co., Ltd.; Burnock D6-627, Burnock D8-436, Burnock D8-973, and Burnock 11-408 available from DIC Corporation; Desmophen 650MPA, Desmophen 670, Desmophen 1150, and Desmophen A160X available from Sumika Bayer Urethane Co., Ltd.; and Hariacron 2000 and Hariacron 8500H available from Harima Chemicals, Inc.

Next, the polyisocyanate composition will be described. The polyisocyanate composition contains one or two or more polyisocyanate compound. Examples of the polyisocyanate compound include a compound having at least two isocyanate groups.

Examples of the polyisocyanate compound include an aromatic diisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and para-phenylene diisocyanate (PPDI); an alicyclic diisocyanate or aliphatic diisocyanate such as 4,4'-dicyclohexylmethane diisocyanate ($H_{12}$MDI), hydrogenated xylylene diisocyanate ($H_6$XDI), hexamethylene diisocyanate (HDI), isophorone diisocyanate (IPDI), and norbornene diisocyanate (NBDI); and a triisocyanate such as an allophanate product, a biuret product, an isocyanurate product and an adduct of the above diisocyanates. In the present invention, two or more of the polyisocyanates are preferably used.

The allophanate product is, for example, a triisocyanate obtained by further reacting a diisocyanate with a urethane bond formed through a reaction between a diisocyanate and a low molecular weight diol. The adduct is a triisocyanate obtained through a reaction between a diisocyanate and a low molecular weight triol such as trimethylolpropane or glycerin. The biuret product is, for example, a triisocyanate having a biuret bond represented by the following chemical formula (1). The isocyanurate product of the diisocyanate is, for example, a triisocyanate represented by the following chemical formula (2).

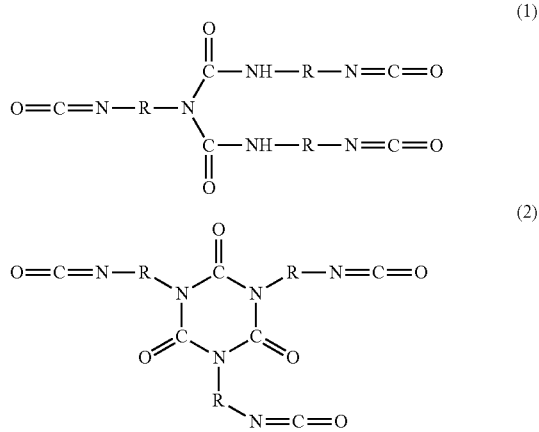

In the chemical formulae (1) and (2), R represents a residue where isocyanate groups are removed from the diisocyanate.

As the triisocyanate, an isocyanurate product of hexamethylene diisocyanate, a biuret product of hexamethylene diisocyanate, and an isocyanurate product of isophorone diisocyanate are preferable. In particular, in the case of using the biuret product of hexamethylene diisocyanate and the isocyanurate product of hexamethylene diisocyanate in combination, a mixing ratio (biuret product/isocyanurate product) thereof preferably ranges from 20/40 to 40/20, and more preferably ranges from 25/35 to 35/25 in a mass ratio.

The polyisocyanate composition preferably contains the triisocyanate compound. The content of the triisocyanate compound in the polyisocyanate contained in the polyisocyanate composition is preferably 50 mass % or more, more preferably 60 mass % or more, and even more preferably 70 mass % or more. It is most preferable that the polyisocyanate composition contains only the triisocyanate compound as the polyisocyanate compound.

The content of the isocyanate group (NCO %) in the polyisocyanate contained in the polyisocyanate composition is preferably 0.5 mass % or more, more preferably 1 mass % or more, and even more preferably 2 mass % or more, and is preferably 45 mass % or less, more preferably 40 mass % or less, and even more preferably 35 mass % or less. It is noted that the content of the isocyanate group (NCO %) in the polyisocyanate can be defined by the following expression.

NCO (%)=100×[mole number of the isocyanate group in the polyisocyanate ×42 (molecular weight of NCO)]/[total mass (g) of the polyisocyanate]

Specific examples of the polyisocyanate include Burnock D-800, Burnock DN-950, and Burnock DN-955 available from DIC corporation; Desmodur N75MPA/X, Desmodur N3300, Desmodur L75 (C), and Sumidur E21-1 available from Sumika Bayer Urethane Co., Ltd.; Coronate HX and Coronate HK available from Nippon Polyurethane Industry Co., Ltd.; Duranate 24A-100, Duranate 21S-75E, Duranate TPA-100, and Durante TKA-100 available from Asahi Kasei Chemicals Corporation; and VESTANAT T1890 available from Degussa.

The paint film of the golf ball according to the present invention is preferably formed from a paint containing the polyol composition and the polyisocyanate composition. Examples of the paint include a so-called two-component curing type paint including a first agent containing the polyol composition and a second agent containing the polyisocyanate composition. The paint may be either a waterborne paint mainly containing water as a dispersion medium or a solvent-based paint mainly containing an organic solvent as a dispersion medium. In case of the solvent-based paint, preferable examples of the solvent include toluene, isopropyl alcohol, xylene, methyl ethyl ketone, methyl ethyl isobutyl ketone, ethylene glycol monomethyl ether, ethylbenzene, propylene glycol monomethyl ether, isobutyl alcohol, and ethyl acetate.

The total solid content of the first agent and the second agent in the two-component curing type paint is preferably 30 mass % or more, more preferably 31 mass % or more, and even more preferably 32 mass % or more, and is preferably 45 mass % or less, more preferably 44 mass % or less, and even more preferably 43 mass % or less. If the solid content is 30 mass % or more, it becomes easier to apply the paint uniformly, and thus the thickness of the obtained paint film is more uniform. If the solid content is 45 mass % or less, the leveling property of the paint becomes better, unevenness on the surface of the paint film is lowered, and thus the appearance of the obtained golf ball becomes better.

If necessary, the paint may further contain an additive generally contained in a golf ball paint, such as a filler, an ultraviolet absorber, an antioxidant, a light stabilizer, a fluorescent brightener, an anti-blocking agent, a leveling agent, a slip agent, and a viscosity modifier.

Next, the method of applying the curing type paint according to the present invention will be described. The method of applying the curing type paint is not particularly limited, and a conventionally known method such as a spray coating method or an electrostatic coating method can be employed.

In case of spray coating using an air gun, the polyol component and the polyisocyanate component may be fed with respective pumps and continuously mixed with a line mixer located in the stream line just before the air gun, and the obtained mixture is subjected to spray coating. Alternatively, the polyol component and the polyisocyanate component may be subjected to spray coating separately by using an air spray system provided with a mixing ratio controlling device. The paint application may be conducted by spray coating one time or overspraying several times.

The curing type paint applied to the golf ball body can be dried, for example, at a temperature ranging from 30° C. to 70° C. for 1 hour to 24 hours to form the paint film.

The thickness of the paint film after drying is not particularly limited, and is preferably 5 μm or more, more preferably 6 μm or more, even more preferably 10 μm or more, and particularly preferably 15 μm or more. If the thickness of the paint film is less than 5 μm, the paint film tends to be easily wear off due to the continued use of the golf ball. Thickening the paint film increases the spin rate on approach shots. Further, the thickness of the paint film is preferably 50 μm or less, more preferably 45 μm or less, and even more preferably 40 μm or less. If the thickness of the paint film exceeds 50 μm, the dimple effect may be lowered, and thus the flying performance of the golf ball tends to be lowered. The thickness of the paint film can be measured, for example, by observing the cross section of the golf ball using a microscope (VHX-1000 manufactured by Keyence Corporation). In case of overpainting the paint, a total thickness of the formed paint film preferably falls within the above range.

The golf ball according to the present invention is not particularly limited, as long as it comprises a golf ball body and a paint film formed on a surface of the golf ball body. The construction of the golf ball body is not particularly limited, and may be a one-piece golf ball; a two-piece golf ball; a three-piece golf ball, a four-piece golf ball, and a multi-piece golf ball comprising five or more pieces; or a wound golf ball. The present invention can be applied appropriately to any one of the above golf ball bodies.

FIG. 1 is a partially cutaway sectional view showing a golf ball 1 according to one embodiment of the present invention. The golf ball 1 comprises a spherical core 2, a cover 3 covering the spherical core 2, and a paint film 4 formed on the surface of the cover 3. A plurality of dimples 31 are formed on the surface of the cover 3. Other portions than dimples 31 on the surface of the cover 3 are lands 32.

The golf ball body preferably comprises a core and a cover covering the core. It is preferred that the slab hardness of the cover composition is appropriately set in accordance with the desired performance of the golf ball. For example, in case of a so-called distance golf ball focusing on a flight distance, the cover composition preferably has a slab hardness of 50 or more, more preferably 55 or more, and preferably has a slab hardness of 80 or less, more preferably 70 or less in shore D hardness. If the cover composition has a slab hardness of 50 or more in Shore D hardness, the obtained golf ball has a high launch angle and low spin rate on driver shots and iron shots, and thus the flight distance thereof becomes large. If the cover composition has a slab hardness of 80 or less in Shore D hardness, the golf ball excellent in durability is obtained. Further, in case of a so-called spin golf ball focusing on controllability, the cover composition preferably has a slab hardness of less than 50, preferably 20 or more, and more preferably 25 or more. If the cover composition has a slab hardness of less than 50 in Shore D hardness, the spin rate on approach shots becomes high. If the cover composition has a slab hardness of 20 or more in Shore D hardness, the abrasion resistance of the obtained golf ball increases.

The cover material constituting the cover is not particularly limited, and examples thereof include an ionomer resin; a polyester resin; a urethane resin such as a thermoplastic urethane resin or a two-component curing type urethane resin; a polyamide resin; a thermoplastic polyamide elastomer having a trade name of "Pebax (registered trademark) (e.g. "Pebax 2533")" commercially available from Arkema K. K.; a thermoplastic polyester elastomer having a trade name of "Hytrel (registered trademark) (e.g. "Hytrel 3548" and "Hytrel 4047")" commercially available from Du Pont-Toray Co., Ltd.; a thermoplastic polyurethane elastomer having a trade name of "Elastollan (registered trademark) (e.g. "Elastollan XNY97A")" commercially available from BASF Japan Ltd.; and a thermoplastic styrene elastomer having a trade name of "Rabalon (registered trademark)" or a thermoplastic polyester elastomer having a trade name of "Primalloy" commercially available from Mitsubishi Chemical Corporation. The cover material may be used solely or as a mixture of two or more of them.

In addition to the aforementioned resin component, the cover may further contain a pigment component such as a white pigment (e.g. titanium oxide), a blue pigment, a red pigment, or the like; a weight adjusting agent such as calcium carbonate, barium sulfate, or the like; a dispersant; an antioxidant; an ultraviolet absorber; a light stabilizer (e.g. bis(2,2,6,6-tetramethyl-4-piperidyl) sebacate); a fluorescent material or a fluorescent brightener; or the like, as long as they do not impair the performance of the cover.

The embodiment for molding the cover composition into the cover is not particularly limited, and examples thereof include an embodiment of injection molding the cover composition directly onto the core; and an embodiment of molding the cover composition into hollow shells, covering the core with a plurality of the hollow shells and subjecting to compression molding (preferably an embodiment of molding the cover composition into hollow half shells, covering the core with two half shells and subjecting to compression molding). The golf ball body having the cover formed thereon is ejected from the mold, and preferably subjected to surface treatments such as deburring, cleaning and sandblast as necessary. Further, if desired, a mark may be formed thereon.

The total number of the dimples formed on the cover is preferably 200 or more and 500 or less. If the total number of the dimples is less than 200, the dimple effect is hardly obtained. On the other hand, if the total number of the dimples exceeds 500, the dimple effect is hardly obtained because the size of the respective dimples is small. The shape (shape in a plan view) of the formed dimples includes, for example, without limitation, a circle; a polygonal shape such as a roughly triangular shape, a roughly quadrangular shape, a roughly pentagonal shape, and a roughly hexagonal shape; and other irregular shape. The shape of the dimples may be employed solely, or two or more of the shapes may be employed in combination.

In the present invention, a ratio of the total area of all the dimples to the surface area of a phantom sphere is referred to as an occupation ratio. The phantom sphere is a golf ball (spherical body) without dimples formed thereon. In the golf ball according to the present invention, the occupation ratio of the dimples is preferably 60% or more, more preferably 63% or more, and even more preferably 66% or more, and is preferably 90% or less, more preferably 87% or less, and even more preferably 84% or less. If the occupation ratio is too high, the contribution of the paint film to the coefficient of friction becomes small. Further, if the occupation ratio is too low, the flight performance may be lowered.

The area of the dimple is the area of a region enclosed in the contour line of the dimple when observing the central point of the golf ball from infinity. In case of a circular dimple, the area S of the dimple is calculated according to the following mathematical formula.

$$S=(Di/2)^2 \cdot \pi \text{ (Di: diameter of the dimple)}$$

The golf ball preferably has a diameter ranging from 40 mm to 45 mm. In light of satisfying the regulation of US Golf Association (USGA), the diameter is particularly preferably 42.67 mm or more. In light of prevention of the air resistance, the diameter is preferably 44 mm or less, and even more preferably 42.80 mm or less. The golf ball preferably has a mass of 40 g or more and 50 g or less. In light of obtaining greater inertia, the mass is preferably 44 g or more, and more preferably 45.00 g or more. In light of satisfying the regulation of USGA, the mass is preferably 45.93 g or less.

Next, the core used in the wound golf ball, two-piece golf ball and multi-piece golf ball, as well as the one-piece golf ball body will be explained.

The core or one-piece golf ball body may employ a conventionally known rubber composition (hereinafter, sometimes simply referred to as "core rubber composition"), and can be formed by, for example, heat-pressing a rubber composition containing a base rubber, a co-crosslinking agent, and a crosslinking initiator.

As the base rubber, typically preferred is a high cis-polybutadiene having cis-bond in a proportion of 40 mass % or more, more preferably 70 mass % or more, and even more preferably 90 mass % or more in view of its superior resilience property. The co-crosslinking agent is preferably an $\alpha,\beta$-unsaturated carboxylic acid having 3 to 8 carbon atoms or a metal salt thereof, and more preferably a metal salt of acrylic acid or a metal salt of methacrylic acid. The metal constituting the metal salt is preferably zinc, magnesium, calcium, aluminum or sodium, more preferably zinc. The amount of the co-crosslinking agent is preferably 20 parts by mass or more and 50 parts by mass or less with respect to 100 parts by mass of the base rubber. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect with 100 parts by mass of the base rubber.

Further, the core rubber composition may further contain an organic sulfur compound. As the organic sulfur compound, diphenyl disulfide or a derivate thereof, thiophenol or a derivate thereof, and thionaphthol or a derivate thereof are preferably used. The amount of the organic sulfur compound is preferably 0.1 part by mass or more, more preferably 0.3 part by mass or more, and is preferably 5.0 parts by mass or less, more preferably 3.0 parts by mass or less, with respect with 100 parts by mass of the base rubber. In addition, the core rubber composition may further contain a carboxylic acid and/or a salt thereof. As the carboxylic acid and/or the salt thereof, a carboxylic acid having 1 to 30 carbon atoms and/or a salt thereof is preferred. The amount of the carboxylic acid and/or the salt thereof is preferably 1 part by mass or more and 40 parts by mass or less with respect with 100 parts by mass of the base rubber.

The core rubber composition may appropriately further contain a weight adjusting agent such as zinc oxide and barium sulfate, an antioxidant, a color powder or the like, in addition to the base rubber, the co-crosslinking agent, the crosslinking initiator, and the organic sulfur compound. The molding conditions for heat-pressing the core rubber composition should be determined appropriately depending on the formulation of the rubber composition. Generally, it is preferred that the molding is carried out by heating the core rubber composition at a temperature ranging from 130° C. to 200° C. for 10 minutes to 60 minutes, alternatively, by molding the core rubber composition in a two-step heating, i.e. heated at a temperature ranging from 130° C. to 150° C. for 20 minutes to 40 minutes, and then heated at a temperature ranging from 160° C. to 180° C. for 5 minutes to 15 minutes.

In the case that the golf ball according to the present invention is a three-piece golf ball, a four-piece golf ball and a multi-piece golf ball comprising five or more pieces, examples of the material constituting the intermediate layer disposed between the core and the outermost cover include a thermoplastic resin such as a polyurethane resin, an ionomer resin, a polyamide resin, and polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product obtained by neutralizing at least a part of carboxyl groups in a copolymer composed of ethylene and an $\alpha,\beta$-unsaturated carboxylic acid with a metal ion; and a product obtained by neutralizing at least a part of carboxyl groups in a terpolymer composed of ethylene, an $\alpha,\beta$-unsaturated carboxylic acid and an $\alpha,\beta$-unsaturated carboxylic acid ester with a metal ion. The intermediate layer may further contain a weight adjusting agent such as barium sulfate and tungsten, an antioxidant, and a pigment. Further, the intermediate layer is sometimes referred to as an inner cover or outer core, depending on the construction of the golf ball.

EXAMPLES

Hereinafter, the present invention will be described in detail by way of examples. However, the present invention is not limited to the examples described below, and various changes and modifications can be made without departing from the spirit and scope of the present invention.

[Evaluation Method]

(1) Elastic Modulus of Paint Film

The elastic modulus of the paint film formed on the surface of the golf ball was measured using a scanning probe microscope (SPM) (cantilever: model number SI-DF40, spring constant 28 N/m) in an atomic force microscope (AFM) mode. A region having a length of 1 μm and a width of 1 μm was divided into a grid shape having 256 spots (16 spots in the length direction and 16 spots in the width direction), the measurement was conducted at each spot, and the elastic modulus at each spot was calculated. The value of the elastic modulus was rounded off to the closest integer. The histogram of the elastic modulus was drawn, and the most frequent value in the histogram was adopted as the elastic modulus of the sample.

(2) Spin Rate on Approach Shots

A sand wedge was installed on a swing machine manufactured by True Temper Sports, Inc. The golf ball was hit at a head speed of 21 m/sec, and the spin rate (rpm) was measured by taking a sequence of photographs of the hit golf ball. This measurement was conducted ten times for each golf ball, and the average value thereof was adopted as the spin rate.

(3) Stain Resistance

The golf ball was immersed for 30 seconds in an aqueous solution of tincture of iodine obtained by diluting a tincture of iodine (an ethanol solution containing 6 mass % of iodine and 4 mass % of potassium iodide) to 40 times, and then taken out. After the extra aqueous solution of tincture of iodine adhered on the surface of the golf ball was wiped off, color tones (L, a, b) of the golf ball before and after the immersion were measured using a color difference meter (CM3500D manufactured by Konica Minolta Inc.), and the color difference (ΔE) was calculated according to the following equation. A larger color difference value (ΔE) means a larger color change extent.

$$\Delta E = [(\Delta L)^2 + (\Delta a)^2 + (\Delta b)^2]^{1/2}$$

Evaluation Standard
- E (excellent): ΔE is 25 or less
- G (good): ΔE is more than 25 and 30 or less
- F (fair): ΔE is more than 30 and 35 or less
- P (poor): ΔE is more than 35

(4) Appearance

The appearance of the golf ball was observed visually, and evaluated according to the following evaluation standard.
- G (good): The surface is smooth and glossy.
- P (poor): The surface is uneven and is not glossy.

(5) Shot Feeling

The golf ball was hit by ten golfers using a driver, and the shot feeling thereof was evaluated. In accordance with the number of the golfers answering "the impact was small and the shot feeling was good", the golf ball was evaluated according to the following evaluation standard.
- E (excellent): 8 or more
- G (good): 5 to 7
- F (fair): 2 to 4
- P (poor): 1 or less

[Production of Golf Ball]

1. Production of Center

The center rubber composition having the formulation shown in Table 1 was kneaded, and heat-pressed in upper and lower molds, each having a semispherical cavity, at 170° C. for 20 minutes to obtain the spherical center having a diameter of 39.3 mm. The amount of barium sulfate was adjusted such that the golf ball had a mass of 45.3 g.

TABLE 1

| Center rubber composition | | |
|---|---|---|
| Formulation (parts by mass) | Polybutadiene rubber | 100 |
| | Zinc acrylate | 35 |
| | Zinc oxide | 5 |
| | Barium sulfate | Appropriate amount |
| | Diphenyldisulfide | 0.5 |
| | Dicumyl peroxide | 0.9 |

Polybutadiene rubber: "BR730 (high-cis polybutadiene)" manufactured by JSR Corporation Zinc acrylate: "ZN-DA90S" manufactured by Nihon Jyoryu Kogyo Co., Ltd.

Zinc oxide: "Ginrei R" manufactured by Toho Zinc Co., Ltd.

Barium sulfate: "Barium Sulfate BD" manufactured by Sakai Chemical Industry Co., Ltd.

Diphenyldisulfide: manufactured by Sumitomo Seika Chemicals Co., Ltd.

Dicumyl peroxide: "Percumyl (registered trademark) D" manufactured by NOF Corporation 2. Preparation of Intermediate Layer Composition and Cover Composition Materials having the formulation shown in Tables 2 and 3 were mixed with a twin-screw kneading extruder to prepare the intermediate layer composition and the cover composition in a pellet form, respectively. The extruding conditions were a screw diameter of 45 mm, a screw rotational speed of 200 rpm, and a screw L/D=35, and the mixture was heated to 200 OC to 260° C. at the die position of the extruder.

TABLE 2

| Intermediate layer composition | | |
|---|---|---|
| Formulation (Parts by mass) | Surlyn 8945 | 55 |
| | Himilan AM7329 | 45 |
| | Titanium dioxide | 4 |

Surlyn (registered trademark) 8945: sodium ion-neutralized ethylene-methacrylic acid copolymer ionomer resin manufactured by E. I. du Pont de Nemours and Company Himilan (registered trademark) AM7329: zinc ion-neutralized ethylene-methacrylic acid copolymer ionomer resin manufactured by Du Pont-Mitsui Polychemicals Co., Ltd.

TABLE 3

| Cover composition | | |
|---|---|---|
| Formulation (parts by mass) | Elastollan XNY82A | 100 |
| | TINUVIN 770 | 0.2 |
| | Titanium dioxide | 4 |
| | Ultramarine blue | 0.04 |
| Hardness (Shore D) | | 29 |

Elastollan (registered trademark) XNY82A: thermoplastic polyurethane elastomer manufactured by BASF Japan Corporation TINUVIN (registered trademark) 770: bis(2,2,6,6-tetramethyl-4-piperidyl) sebacate manufactured by BASF Japan Corporation

3. Production of Spherical Core

The intermediate layer covering the center was formed by injection molding the intermediate layer composition obtained above onto the spherical center directly to obtain the spherical core. The upper and lower molds for molding have a semispherical cavity and a retractable hold pin for holding the spherical center. When forming the intermediate layer, the hold pin was protruded to hold the center, and the intermediate layer composition heated to 260° C. was injected within 0.3 second into the mold held under a pressure of 80 tons and cooled for 30 seconds. Then, the mold was opened to eject the spherical core.

4. Molding of Half Shell

The obtained cover composition in a pellet form was charged one by one into each concave portion of the lower mold of the molds for molding half shells, and the half shells were molded by performing compression. Compression molding was conducted at a molding temperature of 170° C. for 5 minutes under a molding pressure of 2.94 MPa.

5. Molding of Cover

The spherical core obtained above was concentrically covered with two of the half shells, and then subjected to compression molding to form the cover. Compression molding was conducted at a molding temperature of 145° C. for 2 minutes under a molding pressure of 9.8 MPa.

6. Preparation of Paint

Preparation of First Agent

As the polyol component, polytetramethylene ether glycol (PTMG) and trimethylolpropane (TMP) were dissolved in a solvent (toluene and methyl ethyl ketone). Then, dibutyl tin laurate which was used as a catalyst was added therein in an amount of 0.1 mass % with respect to the total amount of the first agent. While keeping the temperature of the obtained polyol solution at 80° C., isophorone diisocyanate (IPDI), as the polyisocyanate component, was added dropwise to the polyol solution and mixed. After adding isophorone diisocyanate, stirring was continued until the isocyanate group no longer existed. Then, the reaction liquid was cooled at the room temperature to prepare the urethane polyol (solid content: 30 mass %). The formulation of each urethane polyol is shown in Table 4.

TABLE 4

| Urethane polyol No. | | 1 | 2 | 3 | 4 | 5 |
|---|---|---|---|---|---|---|
| Component | Polyol component | PTMG TMP | PTMG TMP | PTMG TMP | PTMG TMP | PTMG TMP |
| | Polyisocyanate component | IPDI | IPDI | IPDI | IPDI | IPDI |
| Number average molecular weight of PTMG | | 650 | 800 | 1000 | 1500 | 2000 |
| TMP:PTMG (molar ratio) | | 1.8:1.0 | 1.8:1.0 | 1.8:1.0 | 1.8:1.0 | 1.8:1.0 |
| Molar ratio (NCO/OH) of NCO group in polyisocyanate component to OH group in polyol component | | 0.6 | 0.6 | 0.6 | 0.6 | 0.6 |
| PTMG content (mass %) | | 67 | 71 | 76 | 82 | 86 |
| Hydroxyl value of solid component (mg KOH/g) | | 67.4 | 58.3 | 49.5 | 35.9 | 28.2 |
| Weight average molecular weight | | 4867 | 5620 | 6624 | 9135 | 11646 |

Preparation of Second Agent 30 parts by mass of the isocyanurate-modified product of hexamethylene diisocyanate (Duranate (registered trademark) TKA-100 (NCO content: 21.7 mass %) available from Asahi Kasei Chemicals Corporation), 30 parts by mass of the biuret-modified product of hexamethylene diisocyanate (Duranate 21S-75E (NCO content: 15.5 mass %) available from Asahi Kasei Chemicals Corporation), and 40 parts by mass of the isocyanurate-modified product of isophorone diisocyanate (Desmodur (registered trademark) Z 4470 (NCO content: 11.9 mass %) available from Bayer company) were mixed. As the solvent, a mixed solvent of methyl ethyl ketone, n-butyl acetate and toluene was added therein to adjust the concentration of the polyisocyanate component to 60 mass %.

Preparation of Paint

To the first agent prepared above or Polyn #950 (a urethane polyol having a hydroxyl value of 128 mg KOH/g and formed from a polyol component (trimethylolpropane and polyoxytetramethylene glycol) and a polyisocyanate component (isophorone diisocyanate), available from Shinto Paint Co., Ltd.), the second agent was blended in a NCO/OH ratio shown in Table 5, to prepare the paint.

7. Formation of Paint Film

The surface of the golf ball body obtained above was treated with sandblast and marked. The paint was applied to the golf ball body with an air gun, and then dried for 24 hours in an oven at 40° C. to obtain the golf ball having a diameter of 42.7 mm and a mass of 45.3 g. The thickness of the paint film was 20 μm. The application of the paint was conducted as follows. The golf ball body was placed in a rotating member provided with three prongs, and the rotating member was allowed to rotate at 300 rpm. The application of the paint was conducted by spacing a spray distance (7 cm) between the air gun and the golf ball body, and moving the air gun in an up and down direction. The painting interval in the overpainting operation was set to 1.0 second. The application of the paint was conducted under the spraying conditions of overpainting operation, twice, spraying air pressure: 0.15 MPa, compressed air tank pressure: 0.10 MPa, painting time per one application: one second, atmosphere temperature: 20° C. to 27° C., and atmosphere humidity: 65% or less. Evaluation results of the obtained golf ball are shown in Table 5.

TABLE 5

| Golf ball No. | | | 1 | 2 | 3 | 4 | 5 | 6 | 7 | 8 | 9 | 10 | 11 | 12 |
|---|---|---|---|---|---|---|---|---|---|---|---|---|---|---|
| Paint | First agent | Urethane polyol No. | 1 | 2 | 3 | 4 | 5 | 3 | 4 | 2 | Polin #950 | 3 | 3 | 3 |
| | | Number average molecular weight of PTMG | 650 | 800 | 1000 | 1500 | 2000 | 1000 | 1500 | 800 | Less than 800 | 1000 | 1000 | 1000 |
| | | Second agent/first agent (NCO/OH molar ratio) | 0.54 | 0.80 | 0.80 | 0.80 | 0.80 | 1.23 | 1.06 | 0.69 | 0.80 | 1.39 | 0.48 | 0.80 |
| | | Solid content (mass %) | 35 | 35 | 35 | 35 | 35 | 35 | 35 | 35 | 35 | 35 | 35 | 50 |
| Properties of paint film | | Elastic modulus (MPa) | 125 | 173 | 110 | 73 | 43 | 250 | 125 | 120 | 315 | 305 | 5 | 110 |
| | | 960 × [NCO/OH]−470 | 48 | 298 | 298 | 298 | 298 | 711 | 548 | 192 | 298 | 864 | −9 | 298 |
| Evaluation of golf ball | | Spin rate on approach shots (rpm) | 3100 | 3142 | 3190 | 3200 | 3220 | 3020 | 3105 | 3160 | 3100 | 2980 | 3010 | 2950 |
| | | Stain resistance | P | E | E | E | E | E | E | E | E | G | P | F |
| | | Appearance | G | G | G | G | G | G | G | G | G | G | G | P |
| | | Shot feeling | E | E | E | E | E | E | E | E | P | P | E | F |

Golf balls No. 2 to No. 8 and No. 12 are the cases where the molar ratio (NCO/OH) is 0.6 or more, and the paint film has an elastic modulus of 300 MPa or less. These Golf balls No. 2 to No. 8 and No. 12 show excellent shot feeling and stain resistance. Among them, Golf balls No. 2 to No. 8 are the cases where the paint has a solid content ranging from 30 mass % to 45 mass %. The paint of these Golf balls No. 2 to No. 8 shows better leveling property, the paint film of these Golf balls No. 2 to No. 8 shows better uniformity, and these Golf balls No. 2 to No. 8 show further enhanced stain resistance and shot feeling as well as better appearance. Golf balls No. 1 and No. 11 are the cases where the molar ratio (NCO/OH) is less than 0.6, and show worse stain resistance. Golf balls No. 9 and No. 10 are the cases where the paint film has an elastic modulus higher than 300 MPa, and show worse shot feeling.

The present invention is useful for a painted golf ball. This application is based on Japanese Patent application No. 2014-266656 filed on Dec. 26, 2014, the contents of which are hereby incorporated by reference.

The invention claimed is:

1. A golf ball comprising a golf ball body and a paint film formed on a surface of the golf ball body, wherein a base resin constituting the paint film includes a polyurethane obtained by a reaction between a polyol composition and a polyisocyanate composition, a molar ratio (NCO/OH) of an isocyanate group (NCO group) of the polyisocyanate composition to a hydroxyl group (OH group) of the polyol composition is 0.6 or more, and the paint film has an elastic modulus of 300 MPa or less, and
wherein the polyol composition contains a urethane polyol having a weight average molecular weight ranging from 5,000 to 9,135 and including a polyether diol having a number average molecular weight ranging from 800 to 3,000 as a constituent component.

2. The golf ball according to claim 1, wherein the elastic modulus of the paint film ranges from 40 MPa to 250 MPa.

3. The golf ball according to claim 1, wherein the molar ratio (NCO/OH) ranges from 0.65 to 1.2.

4. The golf ball according to claim 1, wherein the paint film is formed from a paint having a solid content ranging from 30 mass % to 45 mass %.

5. The golf ball according to claim 1, wherein the elastic modulus of the paint film and the molar ratio (NCO/OH) satisfy the following formula:

$$Y \leq 960 \times X - 470$$

in the formula, Y represents the elastic modulus (MPa) of the paint film, and X represents the molar ratio (NCO/OH).

6. The golf ball according to claim 1, wherein the urethane polyol further includes a triol as a constituent component.

7. The golf ball according to claim 6, wherein a mixing ratio (triol/diol) of the triol to the polyether diol having a number average molecular weight ranging from 800 to 3,000 ranges from 0.2 to 6.0 in a mass ratio.

8. The golf ball according to claim 6, wherein the triol is trimethylolpropane.

9. The golf ball according to claim 1, wherein a content of the polyether diol having a number average molecular weight ranging from 800 to 3,000 in the constituent component of the urethane polyol is 70 mass % or more.

10. The golf ball according to claim 1, wherein the urethane polyol has a hydroxyl value ranging from 10 mg KOH/g to 200 mg KOH/g.

11. The golf ball according to claim 1, wherein the polyisocyanate composition contains a triisocyanate.

12. The golf ball according to claim 1, wherein the polyisocyanate composition contains an isocyanurate product of hexamethylene diisocyanate, a biuret product of hexamethylene diisocyanate, and an isocyanurate product of isophorone diisocyanate.

13. The golf ball according to claim 12, wherein a mixing ratio (biuret product/isocyanurate product) of the biuret product of hexamethylene diisocyanate to the isocyanurate product of hexamethylene diisocyanate ranges from 20/40 to 40/20 in a mass ratio.

14. The golf ball according to claim 1, wherein the paint film has a thickness ranging from 5 μm to 50 μm.

15. A golf ball comprising a golf ball body and a paint film formed on a surface of the golf ball body, wherein a base resin constituting the paint film includes a polyurethane obtained by a reaction between a polyol composition and a polyisocyanate composition, a molar ratio (NCO/OH) of an isocyanate group (NCO group) of the polyisocyanate composition to a hydroxyl group (OH group) of the polyol composition is 0.6 or more, and the paint film has an elastic modulus of 300 MPa or less, and
wherein the polyol composition contains a urethane polyol including a polyether diol having a number average molecular weight ranging from 800 to 3,000 as a constituent component, a content of the polyether diol having the number average molecular weight ranging from 800 to 3,000 in the constituent component of the urethane polyol is 70 mass % or more, the urethane polyol further includes a triol as a constituent component, and a mixing ratio (triol/diol) of the triol to the polyether diol having a number average molecular weight ranging from 800 to 3,000 ranges from 0.2 to 6.0 in a mass ratio.

16. The golf ball according to claim 15, wherein the urethane polyol has a weight average molecular weight ranging from 5,000 to 20,000.

17. The golf ball according to claim 15, wherein the urethane polyol has a hydroxyl value ranging from 10 mg KOH/g to 200 mg KOH/g.

18. The golf ball according to claim 15, wherein the polyisocyanate composition contains an isocyanurate product of hexamethylene diisocyanate, a biuret product of hexamethylene diisocyanate, and an isocyanurate product of isophorone diisocyanate, and a mixing ratio (biuret product/isocyanurate product) of the biuret product of hexamethylene diisocyanate to the isocyanurate product of hexamethylene diisocyanate ranges from 20/40 to 40/20 in a mass ratio.

19. The golf ball according to claim 15, wherein the paint film has a thickness ranging from 5 μm to 50 μm.

* * * * *